United States Patent [19]

Takagi et al.

[11] Patent Number: 5,310,776
[45] Date of Patent: May 10, 1994

[54] PROCESS FOR PREPARING THERMOPLASTIC RESIN COMPOSITION

[75] Inventors: Kiyoji Takagi; Yoshihiro Kurasawa; Koji Nishida; Shigekazu Ohi; Kenji Mori; Tsukasa Sato; Tosio Itou, all of Yokkaichi, Japan

[73] Assignee: Mitsubishi Petrochemical Co., Ltd., Tokyo, Japan

[21] Appl. No.: 54,092

[22] Filed: Apr. 30, 1993

[30] Foreign Application Priority Data

May 13, 1992 [JP] Japan ................... 4-120648
May 13, 1992 [JP] Japan ................... 4-120649
May 13, 1992 [JP] Japan ................... 4-120651

[51] Int. Cl.⁵ .............. C08K 5/01; C08K 5/03; C08L 71/12; C08L 77/00
[52] U.S. Cl. ................... 524/474; 528/501; 525/68; 525/92; 525/397; 525/132
[58] Field of Search ............ 524/474, 476; 525/66, 525/68, 92, 132, 397; 528/501

[56] References Cited

U.S. PATENT DOCUMENTS

| | | | |
|---|---|---|---|
| 4,436,870 | 3/1984 | Hinselman et al. | 525/68 |
| 4,746,482 | 5/1988 | Ribbing et al. | 525/68 |
| 4,879,360 | 11/1989 | Kobagashi et al. | 525/397 |
| 4,957,966 | 9/1990 | Nishio et al. | 525/66 |
| 4,968,749 | 11/1990 | Shibuga et al. | 525/397 |
| 5,026,787 | 6/1991 | Takazi et al. | 525/397 |
| 5,073,596 | 12/1991 | Inoue et al. | 525/92 |
| 5,084,511 | 1/1992 | Abe et al. | 525/397 |
| 5,091,473 | 2/1992 | Arashiro et al. | 525/92 |
| 5,132,365 | 7/1992 | Gallucci | 525/66 |

FOREIGN PATENT DOCUMENTS

| | | |
|---|---|---|
| 0235384 | 9/1987 | European Pat. Off. . |
| 0236596 | 9/1987 | European Pat. Off. . |
| 0268280 | 5/1988 | European Pat. Off. . |
| 0338269 | 10/1989 | European Pat. Off. . |
| 0430545 | 6/1991 | European Pat. Off. . |
| 0464351 | 1/1992 | European Pat. Off. . |
| 0193928 | 11/1984 | Japan ................... 525/132 |

*Primary Examiner*—Paul R. Michl
*Assistant Examiner*—Peter Szekely
*Attorney, Agent, or Firm*—Oblon, Spivak, McClelland, Maier & Neustadt

[57] ABSTRACT

There is disclosed a process for preparing a thermoplastic resin composition which comprises melting and kneading (A) 100 parts by weight of a resin comprising 100% by weight in total of:
  (a) 5 to 95% by weight of a non-crystalline thermoplastic resin,
  (b) 95 to 5% by weight of a crystalline thermoplastic resin,
  (c) 0 to 50% by weight of a compatibilizer and
  (d) 0 to 40% by weight of an impact modifier
and
(B) 1.0 part by weight or more of an organic solvent in a kneader equipped with vent ports each having a vacuum device while maintaining each vent port at reduced pressure to make an organic solvent content in a final composition less than 1.0% by weight.

19 Claims, No Drawings

PROCESS FOR PREPARING THERMOPLASTIC RESIN COMPOSITION

BACKGROUND OF THE INVENTION

This invention relates to a process for preparing a thermoplastic resin composition having excellent dimensional stability, heat resistance, impact resistance, solvent resistance and appearance of a molded product.

Non-crystalline thermoplastic resins for molding such as a polyphenylene ether (hereinafter referred to as "PPE") have been generally known as a polymer material or engineering plastics having excellent heat resistance, dimensional stability and electric characteristics, but there are drawbacks that some of them have bad melt fluidity (flowability when melting), whereby molding processing is difficult, and also solvent resistance and impact resistance are poor.

On the other hand, a crystalline thermoplastic resin such as a polyolefin and a saturated polyester has been generally used widely as a polymer material having excellent molding processability, solvent resistance and mechanical strength, low specific gravity and an inexpensive material in the fields of parts for automobiles and parts for electric and electronic equipments. However, the crystalline thermoplastic resin has drawbacks that molding shrinkage rate and linear expansion coefficient are high, and also rigidity is greatly lowered at high temperatures. In order to remove these drawbacks, there has been proposed a method of filling up a reinforcing agent such as glass fiber, but the method has a problem that appearance of a molded product is worsened so that application thereof is limited depending on the field.

If a composition having both good properties of the non-crystalline thermoplastic resin and the crystalline thermoplastic resin and compensating undesirable properties each other can be obtained, an excellent resin material having a wide application field can be provided, and it can be said that industrial significance of such a material is extremely great. Therefore, for the purpose of providing a molding material in which disadvantages of both resins are compensated each other without impairing advantages thereof, there have been proposed, for example, compositions in which a PPE which is a non-crystalline thermoplastic resin and a polyester which is a crystalline thermoplastic resin are simply melted and mixed in Japanese Patent Publication No. 21664/1976 and Japanese Provisional Patent Publications No. 50050/1974, No. 75662/1974 and No. 159847/1984, a composition in which a PPE and a polyamide which is a crystalline thermoplastic resin are simply melted and mixed in Japanese Patent Publication No. 41663/1984, and further a composition in which a PPE and a polyolefin which is a crystalline thermoplastic resin are simply melted and mixed in U.S. Pat. No. 3,361,851 and Japanese Patent Publication No. 7069/1967.

However, in such a simple blend system, the non-crystalline thermoplastic resin and the crystalline thermoplastic resin have inherently poor compatibility with each other so that adhesiveness at an interface of the two phase structure is not good, whereby two phases can hardly take uniform and fine forms. Therefore, when shear stress is applied during molding processing such as injection molding, laminar peeling (delamination) is easily caused, whereby appearance of a resulting molded product is worsened and an interface of two phases becomes a defective portion. Thus, it is impossible to obtain a composition having excellent mechanical characteristics such as impact resistance and rigidity and excellent physical characteristics such as solvent resistance.

Therefore, there have been proposed several techniques of improving compatibility of both resins. For example, in Japanese Provisional Patent Publications No. 218748/1988 and No. 40556/1989, it has been proposed that a specific block copolymer is added as a compatibilizing agent to a resin composition comprising a PPE and a polyolefin, and in Japanese Provisional Patent Publication No. 185553/1990, it has been proposed that polystyrene graft polypropylene is used in a resin composition comprising a PPE, a polyolefin and a rubbery substance. However, a resin composition which can satisfy utility in all points of heat resistance, rigidity, impact resistant strength, solvent resistance and moldability has not yet been obtained. Thus, improvement has been required. There have been also disclosed a method of using a modified PPE obtained by reacting a compound having both (i) a carbon-carbon double bond or a carbon-carbon triple bond and (ii) one or more selected from a carboxylic acid, an acid anhydride, an acid amide, an epoxy group and a hydroxyl group (Japanese Provisional Patent Publications No. 257958/1987 and No. 54427/1988 and PCT Provisional Patent Publication No. 500803/1988), a method of using an alkoxysilyl group-modified PPE (PCT Provisional Patent Publication No. 503392/1988), a method of using an oxazoline-modified PPE (Japanese Provisional Patent Publication No. 187453/1990), a method of using a polyester modified with a hydroxyl group or carboxyl group-terminated polystyrene (Japanese Provisional Patent Publication No. 170852/1990) and a method of formulating oxycarboxylic acids (Japanese Provisional Patent Publication No. 129259/-1990). However, even by using these methods, compatibility of PPE and the saturated polyester cannot be improved sufficiently in many cases, and it cannot be said that mechanical characteristics of resulting compositions are sufficient. Thus, further improvement has been demanded.

SUMMARY OF THE INVENTION

An object of the present invention is to provide a process for preparing a thermoplastic resin composition in which miscibility or compatibility of a non-crystalline thermoplastic resin and a crystalline thermoplastic resin is extremely excellent so that both components exhibit a uniform and fine miscible or compatible state, thereby inhibiting laminar peeling formed when shear stress is applied during molding processing such as injection molding and making a domain dispersed particle size fine, and appearance luster of a resulting molded product is excellent and also dimensional stability, impact resistance, heat resistance and solvent resistance are excellent.

The present inventors have studied intensively in order to solve the above problems, and consequently found that a resin composition prepared by melting and kneading a resin in which a crystalline thermoplastic resin and a non-crystalline thermoplastic resin are formulated at a specific ratio and an organic solvent in a kneader equipped with vent ports each having a vacuum device while maintaining each vent port at a reduced pressure so as to make an organic solvent content in a final composition less than 1.0% by weight is a composition in which a domain dispersed particle size is fine, appearance luster is excellent, and also impact resistance, heat resistance and rigidity are excellent, to accomplish the present invention.

That is, the present invention is a process for preparing a thermoplastic resin composition which comprises melting and kneading:
(A) 100 parts by weight of a resin comprising 100% by weight in total of:
   (a) 5 to 95% by weight of a non-crystalline thermoplastic resin,
   (b) 95 to 5% by weight of a crystalline thermoplastic resin,
   (c) 0 to 50% by weight of a compatibilizer and
   (d) 0 to 40% by weight of an impact modifier
and
(B) 1.0 part by weight or more of an organic solvent in a kneader equipped with vent ports each having a vacuum device while maintaining each vent port at a reduced pressure to make an organic solvent content in a final composition less than 1.0% by weight.

In the preferred embodiment of the present invention, the above thermoplastic resin composition (A) comprises
(a) 9 to 90% by weight of a polyphenylene ether,
(b) 9 to 90% by weight of a polyolefin,
(c) 0.1 to 50% by weight of a compatibilizer and
(d) 0 to 40% by weight of an impact modifier.

In the another preferred embodiment of the present invention, the above thermoplastic resin composition (A) comprises
(a) 4 to 95% by weight of a polyphenylene ether,
(b) 4 to 95% by weight of a saturated polyester,
(c) 0.01 to 50% by weight of a compatibilizer and
(d) 0.5 to 40% by weight of an impact modifier.

DESCRIPTION OF THE PREFERRED EMBODIMENTS

In the following, the present invention is described in detail.

Non-crystalline Thermoplastic Resin (a)

The non-crystalline thermoplastic resin generally has glass-like characteristics and shows a glass transition temperature when it is heated. In the present invention, a non-crystalline thermoplastic resin having a glass transition temperature of 50° C. or higher is preferably used. Further, the non-crystalline thermoplastic resin does not have a clear melting point nor measurable heat of fusion, but in the present invention, a non-crystalline thermoplastic resin showing some crystallinity when it is cooled slowly and also a non-crystalline thermoplastic resin showing crystallinity within the range which does not impair the effect of the present invention significantly are included. The glass transition temperature, melting point and heat of fusion can be measured by a differential thermal calorimeter, for example, DSC-II (trade name) manufactured by Perkin-Elmer Co. That is, by using said device, the heat of fusion can be measured by heating a sample to a temperature of an estimated melting point or higher at a temperature rising rate of 10° C. per 1 minute, cooling the sample to 20° C. at a temperature falling rate of 10° C. per 1 minute, leaving the sample to stand for about 1 minute, and then heating the sample again at a temperature rising rate of 10° C. per 1 minute. As the heat of fusion, values measured in a temperature rising and temperature falling cycle which are constant values within the range of experimental error are employed. The non-crystalline thermoplastic resin in the present invention is defined as a non-crystalline thermoplastic resin having a heat of fusion measured by the above method of less than 1 calorie/gram.

(a-1) Polyphenylene ether

As an example of the non-crystalline thermoplastic resin, there may be mentioned a polyphenylene ether (PPE) which is a homopolymer or copolymer having a structure represented by the formula:

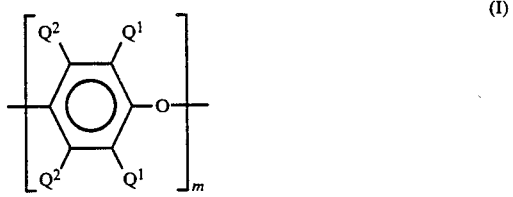

wherein $Q^1$s each represent a halogen atom, a primary or secondary alkyl group, an aryl group, an aminoalkyl group, a haloalkyl group, a hydrocarbonoxy group or a halohydrocarbonoxy group; $Q^2$s each represent a hydrogen atom, a halogen atom, a primary or secondary alkyl group, an aryl group, an aminoalkyl group, a haloalkyl group, a hydrocarbonoxy group or a halohydrocarbonoxy group; and m represents an integer of 10 or more.

As a preferred example of the primary alkyl group represented by $Q^1$ or $Q^2$, there may be mentioned methyl, ethyl, n-propyl, n-butyl, n-amyl, isoamyl, 2-methylbutyl, n-hexyl, 2,3-dimethylbutyl, 2-, 3- or 4-methylpentyl or heptyl. As a preferred example of the secondary alkyl group, there may be mentioned isopropyl, sec-butyl or 1-ethylpropyl. In many cases, $Q^1$ is an alkyl group or a phenyl group, particularly an alkyl group having 1 to 4 carbon atoms, and $Q^2$ is a hydrogen atom.

As a preferred homopolymer of the polyphenylene ether, there may be mentioned, for example, a homopolymer comprising a 2,6-dimethyl-1,4-phenylene ether unit. As a preferred copolymer, there may be mentioned a random copolymer comprising a combination of the above unit and a 2,3,6-trimethyl-1,4-phenylene ether unit. A number of preferred homopolymers or random copolymers are described in patent specifications and literatures. For example, a polyphenylene ether having a molecular structure portion which improves characteristics such as molecular weight, melt viscosity and/or impact resistant strength is also preferred.

(a-1) Polyphenylene ether to be used in the present invention preferably has an intrinsic viscosity measured at 30° C. in chloroform of 0.2 to 0.8 dl/g, more preferably an intrinsic viscosity of 0.2 to 0.7 dl/g, particularly preferably an intrinsic viscosity of 0.25 to 0.6 dl/g. If the intrinsic viscosity is less than 0.2 dl/g, impact resistance of a composition is insufficient, while if it exceeds 0.8 dl/g, moldability of a composition and appearance of a molded product are not satisfactory.

(a-2) Polycarbonate

As another example of the non-crystalline thermoplastic resin, there may be mentioned a polycarbonate (PC). The polycarbonate to be used in the present invention may include an aromatic polycarbonate, an aliphatic polycarbonate and an aliphatic-aromatic polycarbonate. Among them, preferred is an aromatic polycarbonate comprising 2,2-bis(4-oxyphenyl)alkane type, bis(4-oxyphenyl)ether type, bis(4-oxyphenyl)sulfone type, sulfide or sulfoxide type bisphenols. If necessary, a polycarbonate containing bisphenols substituted by a halogen(s) may be also used.

The molecular weight (viscosity average molecular weight) of the polycarbonate is not particularly limited, but it is generally 10,000 or more, preferably 20,000 to 40,000.

As the non-crystalline thermoplastic resin other than those described above, there may be mentioned an ABS resin, an aromatic polysulfone, an aromatic polyether sulfone, an aromatic non-crystalline polyamide, a silicon resin, a polyether imide and a poly(alkyl)acrylate.

Crystalline Thermoplastic Resin (b)

The crystalline thermoplastic resin has a clear crystalline structure or a crystallizable molecular structure and non-glass-like characteristics, and it has measurable a heat of fusion and shows a clear melting point. The melting point and heat of fusion can be measured by a differential thermal calorimeter. The device and measurement method described in <Non-crystalline thermoplastic resin (a)> may be used for measurement. The crystalline thermoplastic resin in the present invention is defined as a crystalline thermoplastic resin having a heat of fusion measured by the above method of 1 calorie/gram or more.

(b-1) Saturated polyester

As an example of the crystalline thermoplastic resin, there may be mentioned a saturated polyester, and as such a polyester, various polyesters may be used.

As one example thereof, there may be mentioned a thermoplastic polyester prepared by condensing a dicarboxylic acid or a lower alkyl ester thereof, an acid halide or an acid anhydride derivative and a glycol or a divalent phenol according to a conventional method.

As a specific example of an aliphatic or aromatic dicarboxylic acid suitable for preparing the above polyester, there may be mentioned oxalic acid, malonic acid, succinic acid, glutaric acid, adipic acid, suberic acid, azelaic acid, sebacic acid, terephthalic acid, isophthalic acid, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, 2,6-naphthalenedicarboxylic acid or 2,7-naphthalenedicarboxylic acid, or a mixture of these carboxylic acids.

As an aliphatic glycol suitable for preparing the above polyester, there may be exemplified by a straight alkylene glycol having 2 to 12 carbon atoms such as ethylene glycol, 1,3-propylene glycol, 1,4-butanediol, 1,6-hexanediol and 1,12-dodecamethylene glycol. As an aromatic glycol compound, there may be exemplified by p-xylylene glycol, and as a divalent phenol, there may be mentioned pyrocatechol, resorcinol, hydroquinone or alkyl-substituted derivatives of these compounds. Other suitable glycols may include 1,4-cyclohexanedimethanol.

As another preferred polyester, there may be mentioned a polyester obtained by ring-opening polymerization of a lactone, for example, polypivalolactone and poly($\epsilon$-caprolactone).

Further, as still another preferred polyester, there may be mentioned a thermotropic liquid crystal polymer (TLCP) which forms liquid crystal in a melt state.

As representative commercially available TLCP, there may be mentioned X7G (trade name) produced by Eastman Kodak Co., Xydar (trade name) produced by Datoco Co., Ekonol (trade name) produced by Sumitomo Kagaku Co. and Vectra (trade name) produced by Celanese Co.

Among the saturated polyesters described above, polyethylene terephthalate (PET), polybutylene terephthalate (PBT), polynaphthalene terephthalate (PEN), poly(1,4-cyclohexanedimethylene terephthalate)(PCT) or a liquid crystalline polyester is a saturated polyester preferably used as the crystalline thermoplastic resin of the present invention.

The saturated polyester to be used in the present invention has an intrinsic viscosity measured at 20° C. in a mixed solution of phenol/1,1,2,2-tetrachloroethane =60/40% by weight preferably of 0.5 to 5.0 dl/g, more preferably 1.0 to 4.0 dl/g, particularly preferably 2.0 to 3.5 dl/g. If the intrinsic viscosity is less than 0.5 dl/g, impact resistance is insufficient, while if it exceeds 5.0 dl/g, moldability is not satisfactory.

(b-2) Polyamide

As another example of the crystalline thermoplastic resin, there may be mentioned a polyamide. The polyamide to be used in the present invention has a —CO—NH— bond in a polymer main chain and can be melted by heating. Representative examples thereof may include nylon-4, nylon-6, nylon-6,6, nylon-4,6, nylon-12 and nylon-6,10 (all trade marks). In addition, a polyamide with low crystallinity containing a known monomer component such as an aromatic diamine and an aromatic dicarboxylic acid may be also used.

A preferred polyamide is nylon-6 or nylon-6,6, and particularly preferred is nylon-6. The polyamide to be used in the present invention preferably has a relative viscosity (measured at 25° C. in 98% concentrated sulfuric acid) of 2.0 to 8.0.

(b-3) Polyolefin

As another example of the crystalline thermoplastic resin, there may mentioned a polyolefin. The polyolefin to be used in the present invention is a homopolymer of an α-olefin such as ethylene, propylene, butene-1, pentene-1, hexene-1, 3-methylbutene-1, 4-methylpentene-1, heptene-1 and octene-1, a random or block copolymer of these α-olefins, a random, graft or block copolymer of a more than half weight (more than 50% by weight) of these α-olefins and other unsaturated monomer or those obtained by subjecting these olefin type polymers to oxidation, halogenation or sulfonation, all of which have at least partial crystallinity derived from polyolefin. These polyolefins may be used singly or in combination of two or more without any problem. As an example of the other saturated monomer, there may be mentioned dienes such as butadiene, isoprene, dicyclopentadiene, 1,4-hexadiene, 4-ethylidene-2-norbornene and dicyclopentadiene; an unsaturated carboxylic acid or a derivative thereof such as acrylic acid, methacrylic acid, maleic acid, itaconic acid, methyl acrylate, ethyl acrylate, methyl methacrylate, maleic anhydride, arylmaleimide and alkylmaleimide; a vinyl ester such as vinyl acetate and vinyl butyrate; an aromatic vinyl compound such as styrene and methyl styrene; a vinyl silane such as vinyl trimethylmethoxysilane and γ-methacryloyloxypropyltrimethoxysilane; and a non-conjugated diene such as dicyclopentadiene and 4-ethylidene-2-norbornene.

The polyolefin can be obtained by polymerization or modification according to a known method, but it may be suitably selected from commercially available products.

Among them, preferred is a homopolymer of propylene, butene-1, 3-methylbutene-1 or 4-methylpentene-1, or a copolymer containing a more than half weight of these monomers, and particularly preferred is a crystalline propylene type polymer, i.e. a crystalline propylene homopolymer, a crystalline propylene-α-olefin block or random copolymer, or a mixture of a copolymer comprising these crystalline propylene copolymers and α-olefin type rubber, i.e. rubbery plural α-olefins, or a mixture of plural α-olefins and non-conjugated dienes, in the point of balance of mechanical physical properties.

In the first preferred embodiment of the present invention, a non-crystalline polymer and a crystalline polymer may be used, but preferred is a crystalline polymer. Among them, polyethylene, polypropylene, poly(1-butene), an ethylenepropylene copolymer, poly(3-methylbutene-1) and poly(4-methylpentene-1) are preferred.

These crystalline propylene type polymers and mixtures of these polymers and α-olefin type rubber have a melt flow rate (MFR) (230° C., load: 2.16 kg) preferably of 0.01 to 250 g/10 min, more preferably 0.05 to 150 g/10 min, particularly preferably 0.1 to 50 g/10 min. If the MFR value is less than the above range, molding processability is not satisfactory, while if it is more than the above range, levels of mechanical properties are undesirably low.

These polyolefins include those in which the molecular weight of a polyolefin having higher molecular weight is lowered by heat treatment in the presence of a radical initiator such as an organic peroxide so as to make MFR values within the above range.

(b-4) Polyphenylene sulfide

As still another example of the crystalline thermoplastic resin, there may be mentioned a polyphenylene sulfide (PPS). The polyphenylene sulfide to be used in the present invention is a crystalline resin having a recurring unit represented by the formula of —(C$_6$H$_4$—S)— as a main constitutional element.

In the present invention, a crystalline resin comprising a recurring unit —(C$_6$H$_4$—S)— as a main constitutional element, i.e. a crystalline resin comprising a recurring unit —(C$_6$H$_4$—S)— or comprising preferably 80 mole % or more, more preferably 90 mole % or more of the recurring unit as a main component is preferred in the points of physical properties such as heat resistance.

If substantially the total amount of the polyphenylene sulfide does not comprise a component comprising the above recurring unit —(C$_6$H$_4$—S)—, its remainder (e.g. up to 20 mole %) may be supplemented by a copolymerizable component comprising, for example, the following recurring unit:

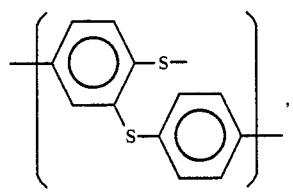

-continued

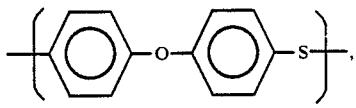

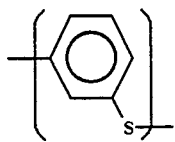

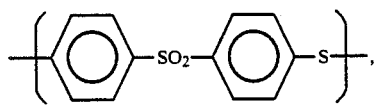

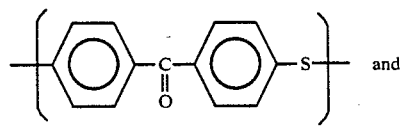

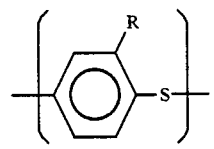

wherein R represents an alkyl group, preferably a lower alkyl group.

The polyphenylene sulfide to be used in the present invention preferably has a substantially linear structure in the points of physical properties of a molded product. However, within the range which does not lower physical properties of a molded product, there may be also used, for example, a polymerized crosslinked product obtained by using an effective amount of a crosslinking agent (e.g. trihalobenzene) during polymerization, or a thermally crosslinked product obtained by crosslinking a polymer by heat treatment in the presence of oxygen.

The polyphenylene sulfide to be used in the composition of the present invention has a melt viscosity at 300° C. preferably of 100 to 20,000 P (poise), more preferably 500 to 10,000 P. If the melt viscosity is less than 100 P, fluidity is too high, whereby molding is difficult, while if the melt viscosity exceeds 20,000 P, fluidity is too low, whereby molding is difficult.

The polyphenylene sulfide to be used in the present invention can be prepared according to any desired method so long as the effect of the present invention is not impaired. As a preferred method which satisfies the above condition, there may be mentioned, for example, a method for preparing a polymer having a relatively small molecular weight as disclosed in Japanese Patent Publication No. 3368/1970, a method for preparing a linear polymer having a relatively high molecular weight as disclosed in Japanese Patent Publication No. 12240/1977 or a method for obtaining a crosslinked product by heating a low molecular weight polymer in the presence of oxygen, or modified methods thereof.

Further, the polyphenylene sulfide may be treated with hot water, if necessary, in the case of using a fibrous filler.

As an example of the crystalline thermoplastic resin other than those described above, there may be mentioned polyacetal (POM), a fluorine resin and polyether ether ketone.

Compatibilizing Agent (c)

The "compatibilizing agent" to be used in the present invention means a polyfunctional non-rubbery compound and/or polymer which interacts with the crystalline thermoplastic resin such as PPE, the non-crystalline thermoplastic resin such as the saturated polyester or both of them chemically, for example, by graft reaction or blocking reaction, or physically, for example, by changing interface characteristics of dispersed phases and/or heightening phase dispersion, to improve compatibility of a resin mixture so as to be shown by impact strength, stretchability (elongation) and weld line strength which are particularly heightened as a result of the interaction. A number of compatibilizing agents suitable for a blend of a PPE and the saturated polyester have been well known as described above, and further other compatibilizing agents have been confirmed as a PPE and saturated polyester system has been more clarified. It can be considered that such compatibilizing agents are all within the scope of the present invention.

Examples thereof may include an alkenyl aromatic compound-conjugated diene copolymer or a hydride thereof, a modified PPE in which a compound having both an unsaturated group and a polar group in the same molecule is subjected to graft polymerization, a modified PPE in which a terminal phenolic hydroxyl group is replaced with a hydroxyalkyl group or an epoxy group, a copolymer of an alkenyl aromatic compound monomer and a compound having both an unsaturated group and a polar group in the same molecule, a modified polyolefin in which a compound having both an unsaturated group and a polar group in the same molecule is subjected to graft polymerization, a modified polyolefin in which an alkenyl aromatic compound monomer or a monomer which can be copolymerized therewith is subjected to graft polymerization and a monomer having these functional groups which can be subjected to graft polymerization. These compounds may be used singly or in combination of two or more.

Examples of various compatibilizing agents which can be used for practicing the present invention are those shown below.

(i) Hydroxyalkylated PPE

The hydroxyalkylated PPE (i) is a PPE in which an alcoholic hydroxy group is added to a terminal phenolic hydroxy group by a modifier, and can be obtained by, for example, the following methods (A) to (E) which have been invented and applied for patent by some of the present inventors, specifically a method in which PPE and a modifier are reacted at a temperature of 50° to 200° C. by using a basic catalyst in the presence or absence of an organic solvent which can solve the PPE.

(A) A method in which the PPE (I) is reacted with glycidol represented by the formula:

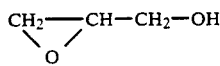 (III$_A$)

to prepare a hydroxyalkylated PPE represented by the formula:

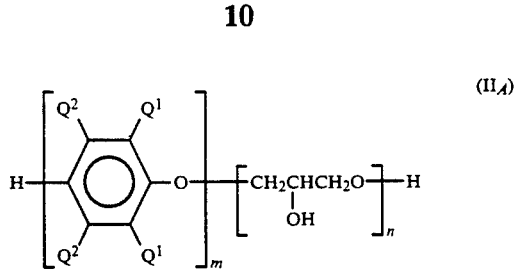

wherein $Q^1$, $Q^2$ and m each have the same meanings as defined above; and n represents an integer of 1 to 10, (Japanese Provisional Patent Publication No. 250025/1991).

(B) A method in which the PPE (I) is reacted with epihalohydrin represented by the formula:

 (III$_B$)

wherein X represents a halogen atom, such as epichlorohydrin, and then the resulting terminal glycidyl-modified PPE is hydrolyzed to prepare a hydroxyalkylated PPE represented by the formula:

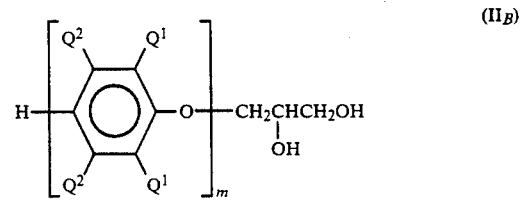

wherein $Q^1$, $Q^2$ and m each have the same meanings as defined above, (Japanese Provisional Patent Publication No. 250025/1991).

(C) A method in which the PPE (I) is reacted with a halogenated alkyl alcohol represented by the formula:

$$X-R^1-OH \qquad (III_C)$$

wherein $R^1$ represents an alkylene group having 1 to 10 carbon atoms; and X has the same meaning as defined above, such as 2-chloroethanol and 3-chloro-1-propanol to prepare a hydroxyalkylated PPE represented by the formula:

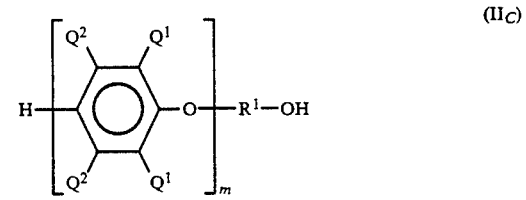

wherein $Q^1$, $Q^2$, m and $R^1$ each have the same meanings as defined above, (Japanese Provisional Patent Publication No. 292326/1991).

(D) A method in which the PPE (I) is reacted with an alkylene carbonate represented by the formula:

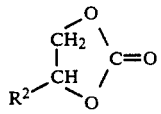
(III$_D$)

wherein R$^2$ represents a hydrogen atom or an alkyl group having 1 to 8 carbon atoms, such as ethylene carbonate and propylene carbonate to prepare a hydroxyalkylated PPE represented by the formula:

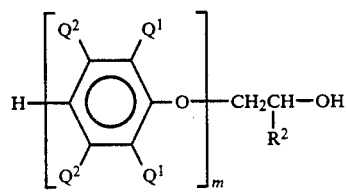
(II$_D$)

wherein Q$^1$, Q$^2$, m and R$^2$ each have the same meanings as defined above, (Japanese Provisional Patent Publication No. 250027/1991).

(E) A method in which the PPE (I) is reacted with an alkylene oxide represented by the formula:

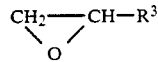
(III$_E$)

wherein R$^3$ represents a hydrogen atom or an alkyl group having 1 to 8 carbon atoms, such as ethylene oxide or propylene oxide to prepare a hydroxyalkylated PPE represented by the formula:

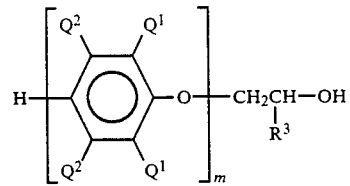
(II$_E$)

wherein Q$^1$, Q$^2$, m and R$^3$ each have the same meanings as defined above, (Japanese Provisional Patent Publication No. 128021/1988).

The organic solvent to be used in these reactions may include an aromatic hydrocarbon such as benzene, toluene and xylene; a halogenated hydrocarbon such as chloroform and carbon tetrachloride; a halogenated aromatic hydrocarbon such as chlorobenzene and dichlorobenzene; and a heterocyclic compound such as N-methyl-2-pyrrolidone and 1,3-dimethyl-2-imidazolidinone.

As the basic catalyst, there may be mentioned an alcoholate such as sodium methoxide and sodium ethoxide; an alkali metal hydroxide such as sodium hydroxide and potassium hydroxide; and an alkali metal carbonate such as sodium carbonate and potassium carbonate.

The ratio of the PPE and the modifier to be used in these reactions is 1 to 50 mole of the modifier based on 1 mole of the terminal phenolic hydroxy group of the PPE, and the amount of the basic catalyst to be used is 0.5 to 50 parts by weight based on 100 parts by weight of the PPE.

In the present invention, among the hydroxyalkylated PPEs (II$_A$) to (II$_E$) obtained by the methods (A) to (E) described above, (II$_A$) or (II$_B$) having two or more alcoholic hydroxy groups with different reactivities is preferred, and (II$_A$) is particularly preferred.

(ii) Compound Having Both of Unsaturated Group and Polar Group in the Same Molecule The compound having both of an unsaturated group and a polar group in the same molecule (ii) is a compound having an unsaturated group, i.e. a carbon-carbon double bond or a carbon-carbon triple bond and a polar group, i.e. a functional group which shows affinity to or chemical reactivity with an ester bond contained in the saturated polyester or a carboxyl group or a hydroxy group existing at the terminal of the chain, in the same molecule in combination. Examples of such a functional group may include an epoxy group, a carboxyl group, various salts or acid anhydrides derived from a carboxyl group, a hydroxy group, an oxazoline, an amino group, a nitrile, an ester, an imide and an acid azide.

As a specific example, preferred are glycidyl methacrylate and glycidyl acrylate, and more preferred is a compound having both a glycidyloxy group and a (meth)acrylamide group in the same molecule, or an epoxidized liquid polybutadiene having 0.07% by weight or more of oxirane oxygen, or a copolymer of ethylene and glycidyl methacrylate, or a terpolymer of ethylene, glycidyl methacrylate and a third component which is copolymerizable with ethylene.

The compound having both a glycidyloxy group and a (meth)acrylamide group in the same molecule is represented by the formula (IV):

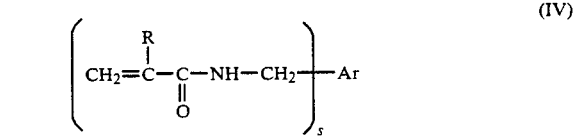
(IV)

wherein Ar represents an arOmatiC hydrocarbon group with 6 to 20 carbon atoms having at least one glycidyloxy group; R represents a hydrogen atom or a methyl group; and s represents an integer of 1 to 4.

Examples of such a compound may include a compound represented by the formula (V):

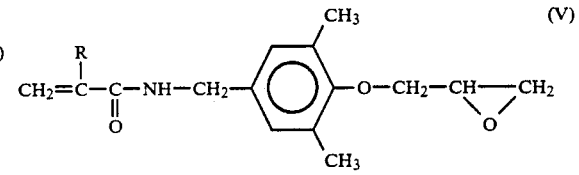
(V)

wherein R has the same meaning as defined above, a compound represented by the formula (VI):

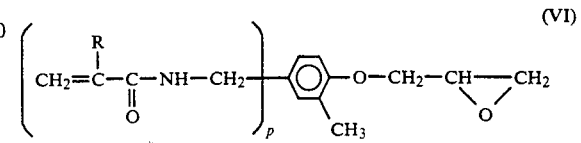
(VI)

wherein R has the same meaning as defined above; and p represents an integer of 1 or 2, and a compound represented by the formula (VII):

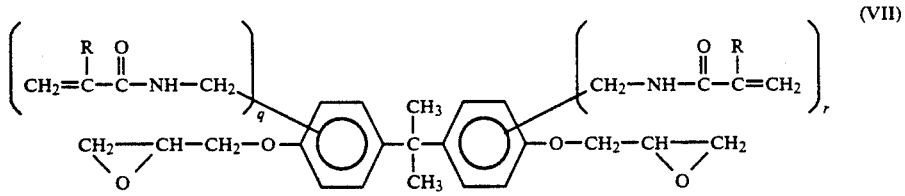

wherein R has the same meaning as defined above; and q and r each represent an integer of 0 to 2 and at least one of q and r is 1 or more.

Among them, preferred is a compound represented by the formula (V) wherein R is a hydrogen atom.

The epoxidized liquid polybutadiene is a liquid polybutadiene epoxidized by adding an oxygen atom to an ethylene bond thereof, and preferably has an oxirane oxygen amount of 0.07% by weight or more and a molecular weight (Mw: weight average molecular weight) in the range of 500 to 10,000.

The oxirane oxygen means an oxygen bonded to an ethylene bond, and the oxirane oxygen amount is % by weight of the oxirane oxygen based on the molecular weight of the epoxidized liquid polybutadiene. Any microstructure of a double bond in the epoxidized liquid polybutadiene, i.e. a vinyl group, a trans-1,4 structure and a cis-1,4 structure with any ratio, is included in the scope of the present invention. The oxirane oxygen amount of the epoxidized liquid polybutadiene to be used in the present invention is preferably 0.07% by weight or more. If the amount is less than 0.07% by weight, impact resistant strength is insufficient.

A copolymer of ethylene and glycidyl methacrylate or a terpolymer of ethylene, glycidyl methacrylate and a copolymerizable third component may be also used. The copolymer or terpolymer having 1% by weight or more of a glycidyl group is particularly preferred.

Impact Modifier (d)

As the impact modifier (d), an elastomer is used. If the elastomer has too high modulus of tension, it does not function as an impact modifier sufficiently so that the modulus of tension of the elastomer is preferably 5,000 kg/cm$^2$ (ASTM D882) or less, more preferably 3,500 kg/cm$^2$ or less. As the elastomer, there may be included natural rubber or diene type synthetic rubber such as polybutadiene and polyisoprene, or a copolymer of such a diene and a vinyl monomer including a vinyl aromatic monomer such as styrene.

Specific examples may include a terpolymer of styrene-butadiene-styrene or a hydride (hydrogenated product) thereof; polybutadiene and polychlorobutadiene such as neoprene; a copolymer of isobutylene and butadiene or isoprene; polyisoprene; a copolymer of ethylene and propylene or a copolymer of ethylene and butadiene; polysulfated rubber; acrylic rubber; and polyurethane rubber.

Also, those in which these elastomers are subjected to graft polymerization with an $\alpha,\beta$-unsaturated dicarboxylic acid such as maleic acid, monomethyl maleate, maleic anhydride, itaconic acid, monomethyl itaconate, itaconic anhydride and fumaric acid, or an alicyclic carboxylic acid such as end-bicyclo[2.2.1]-5-hepten-2,3-carboxylic acid or a derivative thereof by utilizing a peroxide, ionized radiation or UV rays may be used.

Organic Solvent (B)

The organic solvent to be used in the present invention is not particularly limited so long as it is inactive to nucleus-substituted phenols. There may be mentioned, for example, an aromatic hydrocarbon such as benzene, toluene and xylene; a chain or cyclic aliphatic hydrocarbon such as heptane and cyclohexane; a halogenated hydrocarbon such as chlorobenzene, dichlorobenzene, trichlorobenzene and dichloromethane; ethers such as dioxane and diethyl ether; ketones such as cyclohexanone and acetophenone; esters such as ethyl acetate and propiolactone; nitriles such as acetonitrile and benzonitrile; alcohols such as methanol, ethanol, n-propanol, isopropanol, n-butanol and sec-butanol; nitrobenzene; and sulforane. These solvents may be used singly or in combination as a mixture. Preferred is an organic solvent which is a good solvent to a non-crystalline thermoplastic resin and has a solubility parameter (see P.A. Small, J. Appl. Chem., vol. 3, p. 71 (1953)) of 7 to 12, more preferred are an aromatic hydrocarbon, a halogenated hydrocarbon and alcohols, and particularly preferred are xylene, toluene, dichlorobenzene and trichlorobenzene.

Composition Ratio of Constitutional Components

The composition ratio of Components (a) to (d) described above with the total weight of (a) and (b) being 100% by weight is shown below.

Component (a): 5 to 95% by weight, preferably 5 to 90% by weight, more preferably 5 to 70% by weight, particularly preferably 10 to 55% by weight. If the ratio of Component (a) is less than 5% by weight, heat resistant rigidity is insufficient, while if it exceeds 95% by weight, solvent resistance and impact resistance are insufficient. When the PPE is used in combination with a polyolefin, the amount of the PPE is preferably 9 to 90% by weight, more preferably 20 to 85% by weight, particularly preferably 30 to 80% by weight. When the PPE is used in combination with a saturated polyester, the amount of the PPE is preferably 4 to 95% by weight, more preferably 5 to 70% by weight, particularly preferably 10 to 55% by weight.

Component (b): 95 o 5% by weight, preferably 95 to 10% by weight, more preferably 95 to 30% by weight, particularly preferably 90 to 45% by weight. If the ratio of Component (b) is less than 5% by weight, solvent resistance and impact resistance are insufficient, while if it exceeds 95% by weight, heat resistant rigidity is insufficient. When a polyolefin is used in combination with the PPE, the amount of the polyolefin is preferably 9 to 90% by weight, more preferably 12 to 80% by weight, particularly preferably 15 to 70% by weight. When a saturated polyester is used in combination with the PPE, the amount of the saturated polyester is preferably 4 to 95% by weight, more preferably 30 to 95% by weight, particularly preferably 45 to 90% by weight.

Component (c): The amount of the compatibilizing agent to be added may vary depending on the kind, but in general, the amount is 0 to 50% by weight, preferably 0.1 to 40% by weight, more preferably 0.3 to 35% by weight, particularly preferably 0.7 to 25% by weight. When the compatibilizing agent is used in combination with the PPE and a polyolefin, the amount of the compatibilizing agent is preferably 0.1 to 50% by weight, more preferably 0.5 to 40% by weight, particularly preferably 1 to 30% by weight.

When the compatibilizing agent is used in combination with the PPE and a saturated polyester, the amount of the compatibilizing agent is preferably 0.01 to 50% by weight, more preferably 0.5 to 40% by weight, particularly preferably 1 to 35% by weight.

Component (d): The amount of the impact modifier to be added may vary depending on the kind, but in general, the amount is 0 to 40% by weight, preferably 0.5 to 40% by weight, more preferably 3 to 30% by weight, particularly preferably 7 to 20% by weight. When the impact modifier is used in combination with the PPE and a polyolefin, the amount of the impact modifier is preferably 0 to 40% by weight, more preferably 0 to 20% by weight. When the impact modifier is used in combination with the PPE and a saturated polyester, the amount of the impact modifier is preferably 0.5 to 40% by weight, more preferably 3 to 30% by weight, particularly preferably 7 to 20% by weight.

As a formulation ratio of Component (B), its amount to be added based on 100 parts by weight in total of (a) to (d) is 1.0 part by weight or more, preferably 1.0 to 50 parts by weight, particularly preferably 2 to 30 parts by weight. The organic solvent content in a final composition is less than 1.0% by weight, preferably 0.8% by weight or less, particularly preferably 0.5% by weight or less. If the formulation ratio of Component (B) is less than 1.0 part by weight, compatibility, impact resistance and appearance of a product are insufficient. Further, if the organic solvent (B) content in a final composition is 1.0% by weight or more, heat resistance and appearance of a product are insufficient.

Additional Components

To the thermoplastic resin composition according to the present invention, other additional components may be added. For example, an antioxidant, a weatherability-improving agent, a nucleating agent and a flame retardant which have been conventionally known may be used in the non-crystalline thermoplastic resin; and an antioxidant, a weatherability-improving agent, a plasticizer and a fluidity-improving agent which have been conventionally known may be used in the crystalline thermoplastic resin. Also, it is effective for improving rigidity, heat resistance or dimensional stability to add an organic or inorganic filler, a reinforcing agent, particularly glass fiber, mica, talc, wallastonite, potassium titanate, calcium carbonate or silica. Various coloring agents and dispersants thereof which have been conventionally known may be used for practical use.

Preparation and molding method of composition

As a melting and kneading machine for obtaining the thermoplastic resin composition of the present invention, a kneader generally used for a thermoplastic resin may be suitably used so long as it has vent ports. For example, a single axis or plural axis kneading extruder, a roll mixer and a Banbury mixer may be included.

The vent ports should be maintained at reduced pressure so that it is required that the resin in a kneader is partially melted at a front portion of each vent port to seal reduced pressure. Further, when the resin in a kneader is maintained in a melted state for a long time before reaching the vent port, impact resistance is lowered. Therefore, the resin is preferably melted immediately before the vent port as far as possible. Performances of a vacuum device to be linked directly to the vent port may be selected depending on the reduced pressure degree of the vent port, and a type thereof may be optional.

The reduced pressure degree of the vent port is preferably maintained at 200 Torr (26664.4 Pa) or less. If it is more than 200 Torr, heat resistance of the composition and compatibility of the non-crystalline thermoplastic resin and the crystalline thermoplastic resin are worsened (domain dispersed particle size: large), and impact resistance is insufficient. The reduced pressure degree is preferably 100 Torr (13332.2 Pa) or less, particularly preferably 50 Torr (6666.1 Pa) or less.

As to kneading order, all components may be kneaded simultaneously, or kneading may be carried out by using previously kneaded blend materials. Further, kneading may be carried out by feeding the respective components in order from several feeding ports provided midway in an extruder. The organic solvent may be directly charged into an extruder by using a pump.

A molding processing method of the thermoplastic resin composition of the present invention is not particularly limited, and there may be suitably used a molding method generally used for a thermoplastic resin, i.e. a molding method such as injection molding, blow molding, extrusion molding, sheet molding, thermal molding, rotary molding, lamination molding and press molding.

EXAMPLES

In the following, the present invention is described in detail by referring to Examples, but the present invention is not limited by these Examples.

Examples 1 to 7

The following respective components were used.

Component (a): Non-crystalline thermoplastic resin (a-1) PPE: poly(2,6-dimethyl-1,4-phenylene ether)(intrinsic viscosity $[\eta]$ measured at 30° C. in chloroform: 0.4 dl/g) produced by way of trial by Nippon Polyether Co. was used.

Component (b): Crystalline thermoplastic resin (b-1) Saturated polyester: polybutylene terephthalate (PBT) PBT128 (trade name) produced by Kanebo Co. was used.

(b-2) Polyamide: nylon-6 Ultramid B-3 (trade name) produced by BASF Co. was used.

(b-3) Polyolefin: a propylene-ethylene block copolymer BC8DQ (trade name, MFR according to JIS K7210: 1.2 g/10 min, ethylene content by infrared spectral analysis: 5.5% by weight) produced by Mitsubishi Petrochemical Co., Ltd. was used.

Component (c): Compatibilizing agent

Maleic anhydride: a commercially available maleic anhydride (reagent grade) was used.

Component (d): Impact modifier

A hydrogenated styrene-butadiene-styrene copolymers (SEBS) Kraton G1651 and G1652 produced by Shell Chemical Co. were used.

Component (B): Organic solvent

A commercially available xylene (reagent grade) was used.

All of the above components except for Component (B) were sufficiently mixed by stirring using a super mixer according to the formulation ratio as shown in Table 1. Then, the mixtures were melted and kneaded by using a TEX 44 biaxis extruder (trade name) manufactured by Nippon Seikosho Co. at a setting temperature of 230° C. and a screw rotary number of 350 rpm. The organic solvent as Component (B) was directly charged into the first kneading portion by using a pump. The mixtures were melted and kneaded while maintaining each vent port located downstream from the second kneading portion under the reduced pressure conditions shown in Table 1, followed by pelletization, to obtain the respective resin compositions.

The respective resin compositions obtained were subjected to injection molding by using an inline screw type injection molding machine IS-90B Model (trade name, manufactured by Toshiba Machine Co.) at a cylinder temperature of 280° C. and a mold cooling temperature of 80° C. to prepare test pieces.

At injection molding, drying was carried out until immediately before injection molding by using a reduced pressure dryer under conditions of 0.1 Torr and 80° C. for 48 hours. The injection molded test pieces were placed in a desiccator immediately after molding and allowed to stand at 23° C. for 4 to 6 days, and then evaluation tests were conducted. The results are shown in Table 1.

The evaluation tests were conducted according to the following methods.

(1) Flexural modulus

Flexural modulus was measured according to ISO R178-1974 Procedure 12 (JIS K 7203) by using an Instron tester.

(2) Izod impact strength

Izod impact strength was measured according to ISO R180-1969 (JIS K 7110) Izod impact strength with notch by using an Izod impact tester manufactured by Toyo Seiki Seisakusho.

(3) Heat distortion temperature

Heat distortion temperature was measured according to JIS K 7207 by using an HDT tester manufactured by Tokyo Seiki Seisakusho with a load of 4.6 kg.

(4) Dispersion form

A part of the test piece was cut and dipped in toluene at room temperature for 5 seconds to selectively dissolve polyphenylene ether particles. Then, the dispersed particle size was observed by a scanning type electron microscope S-2400 Model (trade name) manufactured by Hitachi Ltd.

(5) Solvent content in final composition

A final composition was subjected to Soxhlet extraction by using n-heptane, and the resulting extract was quantitated by using gas chromatography.

Comparative examples 1 to 3

Procedures were carried out in the same manner as in Examples 1 to 3, respectively, except that the organic solvent (B) was not formulated and each vent was released (atmospheric pressure). The results are shown in Table 1.

Comparative example 4

Procedures were carried out in the same manner as in Example 3 except that 5 parts by weight of the organic solvent (B) was added and each vent was released (atmospheric pressure). The results are shown in Table 1.

Comparative example 5

Procedures were carried out in the same manner as in Example 3 except that the organic solvent (B) was not formulated and the vent reduced pressure degree was made 30 Torr. The results are shown in Table 1.

TABLE 1

| Formulation weight ratio | Example | | | | | | | Compartive Example | | | | |
|---|---|---|---|---|---|---|---|---|---|---|---|---|
| | 1 | 2 | 3 | 4 | 5 | 6 | 7 | 1 | 2 | 3 | 4 | 5 |
| Non-crystalline thermoplastic resin (a) PPE | 30 | 30 | 30 | 30 | 30 | 30 | 30 | 30 | 30 | 30 | 30 | 30 |
| Crystalline thermoplastic resin (b) | | | | | | | | | | | | |
| Saturated polyester | 70 | — | — | — | — | — | — | 70 | — | — | — | — |
| Polyamide | — | 70 | — | 70 | 70 | — | — | — | 70 | — | — | — |
| Polyolefin | — | — | 70 | — | — | 70 | 70 | — | — | 70 | 70 | 70 |
| Compatibilizing agent (c) Maleic anhydride | — | — | — | 1 | 1 | — | — | — | — | — | — | — |
| Impact modifier | | | | | | | | | | | | |
| G1651 | — | — | — | — | 10 | 10 | — | — | — | — | — | — |
| G1652 | — | — | — | — | — | — | 10 | — | — | — | — | — |
| Organic solvent (B) Xylene | 6 | 2 | 20 | 4 | 4 | 15 | 25 | — | — | — | 5 | — |
| Vent reduced pressure degree (Torr) | 10 | 50 | 20 | 30 | 100 | 10 | 15 | Released | Released | Released | Released | 30 |
| Organic solvent content in final composition (% by weight) | 0.2 | 0.1 | 1.5 | 0.3 | 0.5 | 0.7 | 0.4 | — | — | — | 3.9 | — |
| Flexural modulus 23° C. (kg/cm$^2$) | 24,500 | 28,800 | 15,500 | 29,000 | 23,000 | 13,200 | 12,800 | 23,500 | 28,800 | 14,100 | 14,100 | 13,900 |
| Izod impact strength 23° C. (kg · cm/cm$^2$) | 8 | 8 | 6 | 10 | 45 | 12 | 10 | 2 | 3 | 3 | 5 | 3 |

TABLE 1-continued

| Formulation weight ratio | Example | | | | | | | Compartive Example | | | | |
|---|---|---|---|---|---|---|---|---|---|---|---|---|
| | 1 | 2 | 3 | 4 | 5 | 6 | 7 | 1 | 2 | 3 | 4 | 5 |
| −30° C. (kg · cm/cm$^2$) | 3 | 2 | 3 | 3 | 10 | 6 | 4 | 1 | 1 | 2 | 2 | 2 |
| Heat distortion temperature 4.6 kg (°C.) | 181 | 186 | 141 | 185 | 175 | 130 | 128 | 172 | 178 | 135 | 124 | 135 |
| Domain average particle size (μm) | 3.3 | 2.8 | 3.1 | 1.1 | 1.5 | 2.2 | 2.3 | ≧10 | ≧10 | ≧10 | 4.5 | ≧10 |

From the results of the above evaluation tests, the preparation process of the present invention can provide a thermoplastic resin composition in which a domain average particle size is fine and a balance between impact resistance and heat resistance is excellent, and said composition can be used for various purposes, whereby an industrially useful material can be obtained.

Reference example

Preparation of hydrogenated styrene-butadiene-styrene copolymer

A commercially available styrene-butadiene-styrene copolymer TR2400 (trade name, styrene content: about 60% by weight, produced by Nippon Synthetic Rubber Co.) was dried sufficiently, dissolved in cyclohexane from which water had been removed, in an autoclave in which air had been sufficiently replaced with nitrogen, and then subjected to hydrogenation treatment in the presence of a nickel naphthenate catalyst for 7 hours. To the reaction mixture, a poor solvent (methanol) was added, and the mixture was filtered to separate the polymer from the solvent. The polymer was dried under reduced pressure to obtain a partially hydrogenated styrene-butadiene-styrene copolymer (hereinafter referred to as (C-2)).

Examples 8 and 9

The following respective components were used.

Component (a): PPE (a-1): poly(2,6-dimethyl-1,4-phenylene ether)(intrinsic viscosity measured at 30 C in chloroform: 0.5 dl/g) produced by Nippon Polyether Co. was used.

(a-2): poly(2,6-dimethyl-1,4-phenylene ether)(intrinsic viscosity measured at 30° C. in chloroform: 0.30 dl/g) produced by Nippon Polyether Co. was used.

Component (b): Polyolefin (b-1): a propylene homopolymer TA8 (trade name, MFR: 0.8) produced by Mitsubishi Petrochemical Co., Ltd. was used.

(b-2) an ethylene-propylene copolymer BC8DQ (trade name, MFR: 1.2, ethylene content: 5.5% by weight) produced by Mitsubishi Petrochemical Co., Ltd. was used.

Component (c): Compatibilizing agent (c-1): a hydrogenated styrene-isoprene-styrene copolymer Septon 2104 (trade name, styrene content: 65% by weight) produced by Kuraray Co., Ltd. was used.

(c-2): the hydrogenated styrene-butadiene-styrene copolymer obtained in Reference example was used.

Component (B): Organic solvent

A commercially available xylene (reagent grade) was used.

The respective components shown in Table 2 were sufficiently mixed by stirring using a super mixer according to the formulation ratio as shown in Table 2. Then, the mixtures were melted and kneaded by using a TEX 44 biaxis extruder (trade name) manufactured by Nippon Seikosho Co. at a setting temperature of 230° C. and a screw rotary number of 250 rpm while maintaining each vent port at the vent reduced pressure degree shown in Table 2, followed by pelletization, to obtain the respective resin compositions.

The respective resin compositions obtained were subjected to injection molding by using an inline screw type injection molding machine (manufactured by The Japan Steel Works Co., clamping force: 100 T) at a cylinder temperature of 280° C. and a mold cooling temperature of 60° C. to prepare test pieces.

At injection molding, drying was carried out until immediately before injection molding by using a reduced pressure dryer under conditions of 0.1 Torr and 80° C. for 48 hours. The injection molded test pieces were placed in a desiccator immediately after molding and allowed to stand at 23° C. for 4 to 6 days, and then evaluation tests were conducted. The results are shown in Table 2.

The evaluation tests were conducted in the same manner as in Example 1.

Examples 10 and 11

The respective components (a), (b) and (c) shown in Table 2 were sufficiently mixed by stirring using a super mixer according to the formulation ratio as shown in Table 2. Then, subsequent procedures were carried out in the same manner as in Examples 8 and 9 except that while kneading the mixtures by using a TEX 44 biaxis extruder (trade name) manufactured by Nippon Seikosho Co. at a setting temperature of 230° C. and a screw rotary number of 250 rpm, the organic solvent was charged into a mixing zone of the extruder by using a pump. The results are shown in Table 2.

Comparative examples 6 and 7

Procedures were carried out in the same manner as in Examples 8 and 9 except that no organic solvent as Component (B) was formulated and the vent reduced pressure degree was made 8 Torr. The results are shown in Table 2.

Comparative examples 8 and 9

Procedures were carried out in the same manner as in Examples 10 and 11 except that the vent ports were maintained at the reduced pressure degree shown in Table 2. The results are shown in Table 2.

TABLE 2

| Formulation (weight ratio) | Example | | | | Comparative Example | | | |
| --- | --- | --- | --- | --- | --- | --- | --- | --- |
|  | 8 | 9 | 10 | 11 | 6 | 7 | 8 | 9 |
| Polyphenylene ether (a) | | | | | | | | |
| (a-1) | 25 | — | 25 | — | 25 | — | 25 | — |
| (a-2) | — | 25 | — | 25 | — | 25 | — | 25 |
| Polyolefin (b) | | | | | | | | |
| (b-1) | 60 | — | — | — | 60 | — | — | — |
| (b-2) | — | 60 | 60 | 60 | — | 60 | 60 | 60 |
| Compatibilizing agent (c) | | | | | | | | |
| (c-1) | 15 | — | 15 | 15 | 15 | — | 15 | 15 |
| (c-2) | — | 15 | — | — | — | 15 | — | — |
| Organic solvent (B) | 10 | 10 | 30 | 40 | — | — | 30 | 40 |
| Vent reduced pressure degree (Torr) | 9 | 12 | 13 | 15 | 8 | 8 | 400 | 0 |
| Evaluation results | | | | | | | | |
| Solvent content in final composition (% by weight) | 0.2 | 0.3 | 0.5 | 0.6 | — | — | 8.2 | 24.2 |
| Flexural modulus (kg/cm$^2$) | 17,200 | 13,500 | 13,400 | 13,700 | 17,100 | 13,700 | 11,800 | 10,400 |
| Izod impact strength (23° C.) (kg·cm/cm$^2$) | 10 | 33 | 26 | 51 | 3 | 22 | 27 | 52 |
| Heat distortion temperature (°C.) | 132 | 121 | 117 | 120 | 131 | 121 | 107 | 97 |

From the results of the above evaluation tests, the preparation process of the present invention can provide a thermoplastic resin composition having an improved balance between impact resistance and heat resistance and excellent rigidity, and said composition can be used for various purposes, whereby an industrially useful material can be obtained.

Examples 12 to 16

The following respective components were used.

Component (a): PPE (a-1): poly(2,6-dimethyl-1,4-phenylene ether)(intrinsic viscosity measured at 30° C. in chloroform: 0.30 dl/g) produced by way of trial by Nippon Polyether Co. was used.

(a-2): poly(2,6-dimethyl-1,4-phenylene ether)(intrinsic viscosity measured at 30° C. in chloroform: 0.40 dl/g) produced by way of trial by Nippon Polyether Co. was used.

Component (b): Saturated polyester

Polybutylene terephthalate (PBT) PBT128 (trade name) produced by Kanebo Co. was used.

Component (c): Compatibilizing agent

Hydroxyalkylated PPE

To 500 g of a hydroxyalkylated PPE (intrinsic viscosity: 0.41 dl/g) was added 5 liter of toluene and dissolved completely by stirring the mixture under nitrogen atmosphere at 100° C. To the solution, 500 ml of ethanol in which 75 g of sodium ethoxide as a catalyst had been previously dissolved was added, and then 250 g of glycidol was added dropwise. The mixture was stirred at 100° C. for 5 hours. The reaction mixture was poured into 25 liter of methanol to precipitate the resulting hydroxyalkylated PPE. The resulting product was collected by filtration, washed twice with methanol and dried by heating at 80 C under reduced pressure. The resulting hydroxyalkylated PPE was used.

The hydroxyalkylated PPE showed absorption based on a hydroxy group at around 3,380 cm$^{-1}$ of its infrared absorption spectrum. When terminal phenolic hydroxy groups were quantitated, 74% of them reacted, whereby it was confirmed that 26% of unreacted PPE was contained.

The reaction degree of the terminal phenolic hydroxy group of the PPE was calculated by quantitating the terminal phenolic hydroxy groups before reaction and after reaction according to the method described in "Journal of Applied Polymer Science: Applied Polymer Symposium", Vol. 34, pp. 103 to 117 (1987).

Also, an epoxidized alkylamide compound Kaneka AXE (trade name) produced by Kanegafuchi Kagaku Kogyo Co. was used.

Component (d): Impact modifier

Hydrogenated styrene-butadiene block copolymers (SEBS) Kraton G1651 (trade name, styrene content: 33% by weight) and Kraton G1652 (trade name, styrene content: 28% by weight) each produced by Shell Chemical Co. were used.

As compatibilizing aids, a commercially available tetrabutylphosphonium bromide Aldrich (trade name, produced by Aldrich Chemical Co.) and a commercially available titanium tetra(2-ethylhexyloxide) TOT (trade name, produced by Wako) were used.

Component (B): Organic solvent

A commercially available xylene (reagent grade) was used.

All of the above components except for Component (B) were sufficiently mixed by stirring using a super mixer according to the formulation ratio as shown in Table 1. Then, the mixtures were melted and kneaded by using a TEX 44 biaxis extruder (trade name) manufactured by Nippon Seikosho Co. under kneading conditions of a setting temperature of 230° C. and a screw rotary number of 350 rpm. The organic solvent as Component (B) was directly charged into the first kneading portion by using a pump. The mixtures were melted and kneaded under reduced pressure conditions as shown in Table 3 from the vent port located downstream from the second kneading portion to prepare compositions. The compositions were pelletized.

The respective pellets of the above resin compositions were subjected to injection molding by using an inline screw type injection molding machine IS-90B Model (trade name, manufactured by Toshiba Kikai Seisakusho Co.) at a cylinder temperature of 260° C. and a mold cooling temperature of 80° C. to prepare test pieces.

At injection molding, drying was carried out until immediately before injection molding by using a reduced pressure dryer under conditions of 0.1 Torr and 80° C. for 48 hours. The injection molded test pieces were placed in a desiccator immediately after molding and allowed to stand at 23° C. for 4 to 6 days, and then evaluation tests were conducted. The results are shown in Table 3.

The respective physical properties and various characteristics were measured and evaluated in the same manner as in Example 1.

Comparative example 10

Procedures were carried out in the same manner as in Example 14 except that the organic solvent (B) was not formulated. The results are shown in Table 3.

Comparative example 11

Procedures were carried out in the same manner as in Example 15 except that the vent reduced pressure was released (atmospheric pressure). The results are shown in Table 3.

TABLE 3

| Formulation (weight ratio) | Example | | | | | Comparative Example | |
|---|---|---|---|---|---|---|---|
| | 12 | 13 | 14 | 15 | 16 | 10 | 11 |
| Polyphenylene ether resin (a) | | | | | | | |
| (a-1) | — | — | — | — | 7 | — | — |
| (a-2) | 12 | 25 | 5 | 20 | — | 5 | 20 |
| Saturated polyester (b) | | | | | | | |
| PBT (PBT128) | 64 | 63 | 65 | 64 | 52 | 65 | 64 |
| Compatibilizing agent (c) | | | | | | | |
| Hydroxyalkylated PPE | 12 | — | 20 | — | 28 | 20 | — |
| Kaneka AXE | — | 2 | — | 2 | — | — | 2 |
| Impact modifier (d) | | | | | | | |
| G1651 | 12 | 10 | 10 | 14 | — | 10 | 14 |
| G1652 | — | — | — | — | 13 | — | — |
| Compatibilizing aid | | | | | | | |
| Tetrabutylphosphonium bromide | — | 0.1 | — | 0.1 | — | — | 0.1 |
| TOT | — | — | 0.2 | — | 0.2 | 0.2 | — |
| Organic solvent (B) Xylene | 10 | 8 | 20 | 4 | 10 | — | 4 |
| Vent reduced pressure degree (Torr) | 50 | 40 | 30 | 80 | 10 | 30 | Released |
| Organic solvent content in final composition (% by weight) | 0.2 | 0.4 | 0.8 | 0.3 | 0.6 | — | 8.1 |
| Flexural modulus 23° C. (kg/cm$^2$) | 18,800 | 19,900 | 21,000 | 18,500 | 18,000 | 21,100 | 18,000 |
| Izod impact strength | | | | | | | |
| 23° C. (kg · cm/cm$^2$) | 18 | 18 | 25 | 35 | 35 | 13 | 30 |
| −30° C. (kg · cm/cm$^2$) | 6 | 8 | 10 | 12 | 15 | 6 | 10 |
| Heat distortion temperature 4.6 kg (°C.) | 172 | 176 | 184 | 168 | 170 | 182 | 149 |
| Domain average particle size (μm) | 0.2 | — | 0.5 | — | — | 1 to 2 | — |

From the results of the above evaluation tests, the preparation process of the present invention can provide a thermoplastic resin composition having an excellent balance between impact resistance and heat resistance, and said composition can be used for various purposes, whereby an industrially useful material can be obtained.

We claim:

1. A process for preparing a thermoplastic resin composition which comprises melting and kneading
   (A) 100 parts by weight of a resin comprising 100% by weight in total of:
   (a) 5 to 95% by weight of a non-crystalline thermoplastic resin,
   (b) 95 to 5% by weight of a crystalline thermoplastic resin,
   (c) 0 to 50% by weight of a compatibilizer and
   (d) 0 to 40% by weight of an impact modifier
   and
   (B) 1.0 part by weight or more of an organic solvent in a kneader equipped with vent ports each having a vacuum device while maintaining each vent port at reduced pressure to make an organic solvent content in a final composition less than 1.0% by weight.

2. The process according to claim 1, wherein the resin comprises
   (a) 5 to 70% by weight of a non-crystalline thermoplastic resin,
   (b) 95 to 30% by weight of a crystalline thermoplastic resin,
   (c) 0 to 50% by weight of a compatibilizer and
   (d) 0 to 40% by weight of an impact modifier.

3. The process according to claim 1, wherein the resin comprises
   (a) 10 to 55% by weight of a non-crystalline thermoplastic resin,
   (b) 90 to 45% by weight of a crystalline thermoplastic resin,
   (c) 0 to 50% by weight of a compatibilizer and
   (d) 0 to 40% by weight of an impact modifier.

4. The process according to claim 1, wherein said (a) non-crystalline thermoplastic resin is a polyphenylene ether and said (b) crystalline thermoplastic resin is a polyolefin.

5. The process according to claim 1, wherein the resin comprises
   (a) 9 to 90% by weight of a polyphenylene ether,
   (b) 9 to 90% by weight of a polyolefin,
   (c) 0.1 to 50% by weight of a compatibilizer and
   (d) 0 to 40% by weight of an impact modifier.

6. The process according to claim 1, wherein the resin comprises
   (a) 20 to 85% by weight of a polyphenylene ether, (b) 12 to 80% by weight of a polyolefin,
(c) 0.5 to 40% by weight of a compatibilizer and
(d) 0 to 40% by weight of an impact modifier.

7. The process according to claim 1, wherein the resin comprises
   (a) 30 to 80% by weight of a polyphenylene ether,
   (b) 15 to 70% by weight of a polyolefin,
   (c) 1 to 30% by weight of a compatibilizer and
   (d) 0 to 40% by weight of an impact modifier.

8. The process according to claim 1, wherein said (a) non-crystalline thermoplastic resin is a polyphenylene ether and said (b) crystalline thermoplastic resin is a saturated polyester.

9. The process according to claim 1, wherein the resin comprises
   (a) 4 to 95% by weight of a polyphenylene ether,
   (b) 4 to 95% by weight of a saturated polyester,
   (c) 0.01 to 50% by weight of a compatibilizer and
   (d) 0.5 to 40% by weight of an impact modifier.

10. The process according to claim 1, wherein the resin comprises
    (a) 5 to 70% by weight of a polyphenylene ether,
    (b) 30 to 95% by weight of a saturated polyester,
    (c) 0.5 to 40% by weight of a compatibilizer and
    (d) 3 to 30% by weight of an impact modifier.

11. The process according to claim 1, wherein the resin comprises
    (a) 10 to 55% by weight of a polyphenylene ether,
    (b) 45 to 90% by weight of a saturated polyester,
    (c) 1 to 35% by weight of a compatibilizer and
    (d) 7 to 20% by weight of an impact modifier.

12. The process according to claim 1, wherein said (a) non-crystalline thermoplastic resin is a polyphenylene ether and said (b) crystalline thermoplastic resin is a polyamide.

13. The process according to claim 1, wherein an amount of the organic solvent is 1.0 to 50 parts by weight.

14. The process according to claim 1, wherein an amount of the organic solvent is 2 to 30 parts by weight.

15. The process according to claim 1, wherein the pressure of each vent port is maintained at 200 Torr or less.

16. The process according to claim 1, wherein the pressure of each vent port is maintained at 100 Torr or less.

17. The process according to claim 1, wherein the pressure of each vent port is maintained at 50 Torr or less.

18. The process according to claim 1, wherein the organic solvent content in a final composition is made less than 0.8% by weight.

19. The process according to claim 1, wherein the organic solvent content in a final composition is made less than 0.5% by weight.

* * * * *